US005084788A

United States Patent [19]

Hatanaka et al.

[11] Patent Number: 5,084,788

[45] Date of Patent: Jan. 28, 1992

[54] PCM SIGNAL REPRODUCING/RECORDING APPARATUS

[75] Inventors: Yuuji Hatanaka; Hiroo Okamoto; Takao Arai, all of Yokohama; Shin-ichi Wakumura; Ichiro Miyake, both of Tokorozawa; Shunichiro Sakamoto, Kawagoe, all of Japan

[73] Assignees: Hitachi, Ltd.; Pioneer Electric Corporation, both of Tokyo, Japan

[21] Appl. No.: 231,001

[22] Filed: Aug. 11, 1988

[30] Foreign Application Priority Data

| | | | |
|---|---|---|---|
| Aug. 12, 1987 | [JP] | Japan | 62-199866 |
| Aug. 20, 1987 | [JP] | Japan | 62-205020 |

[51] Int. Cl.$^5$ .......... G11B 5/09

[52] U.S. Cl. .......... 360/48; 360/32

[58] Field of Search .......... 360/32, 48, 15

[56] References Cited

U.S. PATENT DOCUMENTS

| | | | |
|---|---|---|---|
| 4,622,600 | 11/1986 | Okamoto et al. | 360/48 |
| 4,758,902 | 7/1988 | Okamoto et al. | 360/15 |
| 4,812,924 | 3/1989 | Fukami et al. | 360/32 |
| 4,839,750 | 6/1989 | Kato et al. | 360/48 |

*Primary Examiner*—Vincent P. Canney
*Attorney, Agent, or Firm*—Antonelli, Terry, Stout & Kraus

[57] ABSTRACT

Disclosed is a PCM signal reproducing/recording apparatus which comprises a reproducing device for reproducing a recording medium carrying PCM data and sub-code data recorded thereon, the sub-code data having sub-data and sub-ID for adding auxiliary information to the PCM data, and a recording device for recording the PCM data and sub-code data transmitted from the reproducing device onto a recording medium. The recording device is arranged to selectively record the sub-code data judged to be correct, onto a recording medium, of those sub-code data transmitted from the reproducing device.

12 Claims, 19 Drawing Sheets

FIG. 4

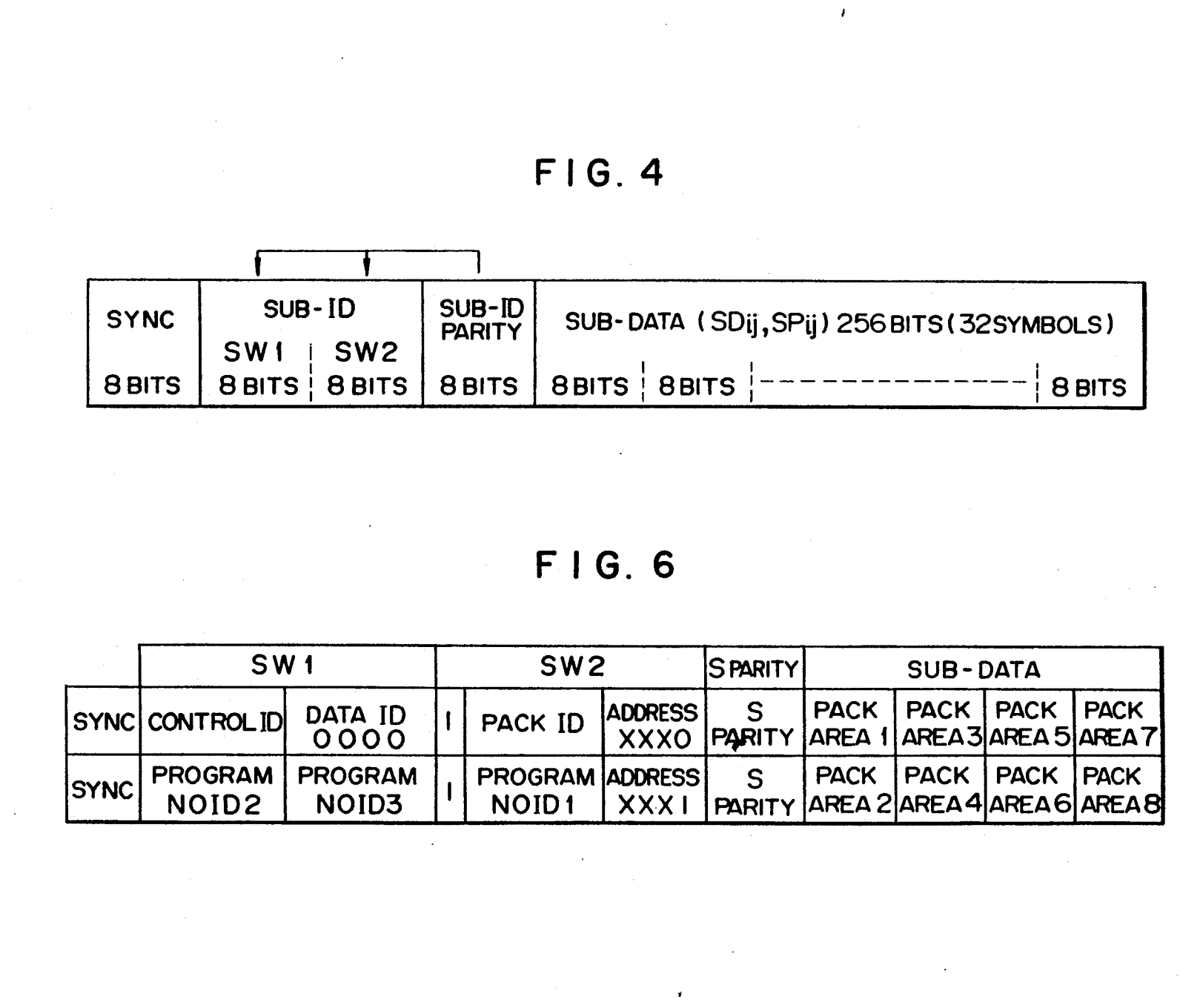

| SYNC | SUB-ID | | SUB-ID PARITY | SUB-DATA (SDij, SPij) 256 BITS (32 SYMBOLS) | | | |
|---|---|---|---|---|---|---|---|
| | SW1 | SW2 | | | | | |
| 8 BITS | 8 BITS | 8 BITS | 8 BITS | 8 BITS | 8 BITS | ---------- | 8 BITS |

FIG. 6

| | SW1 | | SW2 | | | S PARITY | SUB-DATA | | | |
|---|---|---|---|---|---|---|---|---|---|---|
| SYNC | CONTROL ID | DATA ID 0000 | 1 | PACK ID | ADDRESS XXX0 | S PARITY | PACK AREA 1 | PACK AREA 3 | PACK AREA 5 | PACK AREA 7 |
| SYNC | PROGRAM NO ID2 | PROGRAM NO ID3 | 1 | PROGRAM NO ID1 | ADDRESS XXX1 | S PARITY | PACK AREA 2 | PACK AREA 4 | PACK AREA 6 | PACK AREA 8 |

| | MSB | | LSB |
|---|---|---|---|
| $L_0$ | | PNO1 | CONTROL ID |
| $R_0$ | | PNO2 | PNO3 |
| $L_1$ | | | |
| $R_1$ | | | |
| $L_2$ | | | |
| $R_2$ | | | |
| $L_3$ | | PACK ID | DATA ID |
| $R_3$ | | | — $C_1$ FLAG |
| $L_4$ | | | |
| $R_4$ | | | |
| $L_5$ | | | |
| $R_5$ | | PACK 1 | |
| $L_6$ | | | |
| $R_6$ | | | |
| $L_7$ | | | |
| $R_7$ | | | |
| $L_8$ | | | |
| $R_8$ | | | |
| $L_9$ | | | |
| $R_9$ | | PACK 3 | |
| $L_{10}$ | | | |
| $R_{10}$ | | | |
| $L_{11}$ | | | |
| $R_{11}$ | | | |
| $L_{12}$ | | | |
| $R_{12}$ | | | |
| $L_{13}$ | | | |
| $R_{13}$ | | PACK 5 | |
| $L_{14}$ | | | |
| $R_{14}$ | | | |
| $L_{15}$ | | | |
| $R_{28}$ | | | |
| $L_{29}$ | | | |
| $R_{29}$ | | | |
| $L_{30}$ | | PACK 6 | |
| $R_{30}$ | | | |
| $L_{31}$ | | | |
| $R_{31}$ | | | |

PCM SIGNAL REPRODUCING/RECORDING APPARATUS

BACKGROUND OF THE INVENTION

The present invention relates to a PCM signal reproducing/recording apparatus represented by a rotary head digital audio tape recorder (R-DAT), and particularly relates to a PCM signal reproducing/recording apparatus in which data reproduced by a reproducing device is transmitted to a recording device.

In a PCM signal reproducing/recording apparatus, not only main data (PCM data) but sub-code data including sub-data and sub-ID for adding auxiliary information to the PCM data are recorded on a magnetic tape. Reference is made to U.S. Pat. Nos. 4,688,225, 4,544,958, and 4,549,230. The sub-code data is for recording information such as order and time of the PCM data and has information of 64 bites per set. Eight sets of the same information are recorded on one track on a tape.

In the case where data obtained by reproducing a magnetic tape carrying sub-code data and PCM data recorded thereon is to be recorded by a recording device to obtain another magnetic tape having the same contents as that of the first-mentioned recorded magnetic tape, that is, when a so-called copy is made, it is necessary to transmit the data from a reproducing device to the recording device.

In such a case, it is generally considered that the whole of the data reproduced by the reproducing device is transmitted to the recording device so as to be recorded as it is. However, the recording device is not able to record the raw reproduced-data as it is, and therefore it is necessary that the recording device be additionally provided with a function to extract a necessary part, that is, the PCM data and sub-code data, from the received raw reproduced data to thereby reconstruct the recording data. Such a function is the same as that in the reproducing device to extract the PCM data and sub-code data from the data reproduced by the reproducing device. Accordingly, provision of such a function in the recording device means that the same function is provided wastefully in each of the reproducing device and the recording device.

It is therefore considered desirable that the PCM data and sub-code data extracted from the data reproduced in the reproducing device are transmitted as they are to the recording device. In this case, however, there is a problem that a number of signal lines are required because it is necessary to provide not only signal lines for transmitting the PCM data and sub-code data but signal lines for transmitting synchronizing signals.

Further, when the sub-code data reproduced in the reproducing device is directly inputted to the recording device, data representing the validity of the sub-code data, such as flags produced as a result of error correction carried out in the reproducing device, data ID designating the format of the sub-code data, and so on, are also transmitted. In the foregoing conventional apparatus, however, data processing to judge whether the sub-code data such as flags, the data ID, or the like, is correct or not is not carried out when the sub-code data reproduced by the reproducing device is inputted directly into the recording device, and therefore there has been a possibility that data incorrectly reproduced by the reproducing device is recorded on a tape in the recording device.

SUMMARY OF THE INVENTION

It is therefore a first object of the present invention to provide a PCM signal reproducing/recording apparatus in which PCM data and sub-code data extracted from data reproduced from a magnetic tape by a reproducing device can be transmitted through a minimum number of signal lines.

It is a second object of the present invention to provide a PCM signal reproducing/recording apparatus in which, among sub-code data inputted into a recording device from a reproducing device, only the sub-code data which is judged to have been correctly reproduced can be recorded on a tape in the recording device.

In order to attain the above first object of the present invention, the reproducing device of the PCM signal reproducing/recording apparatus according to the present invention is provided with a data transmission means which is arranged so that, when a magnetic tape carrying PCM data and sub-code data having sub-data and sub-ID for adding auxiliary information to the PCM data recorded thereon is reproduced, a sub-frame format of a transmission interface composed of at least a preamble portion, an AUX-DATA portion, and a PCM data portion is formed, and the sub-code data and PCM data reproduced from the recording medium are transmitted in such a way that they are arranged respectively in the AUX-DATA portion and PCM data portion on the sub-frame format.

Preferably, the reproducing device of the PCM signal reproducing/recording apparatus according to the present invention is arranged so that arrangement of the sub-data and sub-ID into the AUX-DATA portion is performed by the frame, that the sub-ID includes program NO and control ID which are transmitted only once for every frame, and that the data transmission is performed with a flag arranged in the AUX-DATA portion to show a state of sub-data correction.

In order to attain the above second object of the present invention, the recording device of the PCM signal reproducing/recording apparatus according to the present invention comprises a validity detection circuit for judging specific data indicating whether the sub-code data is valid or not, a write control circuit for sending a write command to a RAM under control by the validity detection circuit, a sub-code input address generation circuit for accessing a specific address of the RAM when the sub-code data is written into the RAM, and a record data address generation circuit for repeatedly accessing n address of the RAM to which access is made by the sub-code input address generation circuit so as to read out data therefrom.

In the above arrangement, the transmission means of the reproducing device constitutes a sub-frame format of a transmission interface by at least a preamble portion, an AUX-DATA portion, and a PCM data portion, and transmits sub-code data and PCM data reproduced from a recording tape in such a way that the sub-code data and PCM data are arranged respectively in the AUX-DATA portion and PCM data portion on the sub-frame format. That is, the sub-code data and PCM data reproduced from a recording tape and arranged respectively in the AUX-DATA portion and PCM data portion on the sub-frame format are transmitted serially from the reproducing device to the recording device. Accordingly, it is not necessary to provide any specific function in the recording device and the signal lines can be minimized in number.

Further, since the arrangement of the sub-code data is performed by the frame of the reproduced data, it is possible to simplify the operation of the recording device in which the transmitted sub-code data is received and processed to obtain a magnetic tape having the same contents as that of the reproduced magnetic tape.

Further, since the sub-ID has program NO and control ID and the program NO and control ID are transmitted only once in one frame of the reproduced data, the task of receiving and processing the sub-data is reduced correspondingly and efficiently.

Further, since a flag showing the state of sub-data correction is transmitted, the sub-data recording can be performed with high reliability in the recording device in which the data is received.

Flag, data ID, or the like, is added to a head of each set (64 bites) so that when the flag, the data ID, or the like is "0" it shows that one set of the sub-code data following it is valid. Having judged that the flag, the data ID, or the like is "0" by means of the validity detection circuit, the recording device causes the control circuit to send a write command to the RAM only in the input period of the set so that the one set of sub-code data is written into a specific address (sub-code write region) which is accessed by the sub-code input address generation circuit. Thus, one set of the sub-code data, the validity of which has been proved by the flag, the data ID, or the like, is written into the RAM.

On the other hand, when the sub-code data is read out from the RAM so as to be recorded on a magnetic tape, only the data in the sub-code write region is accessed repeatedly eight times by the record data address generation circuit so that eight sets of one and the same valid sub-code data are multiplex-recorded on the tape to thereby prevent recording of erroneous data.

BRIEF DESCRIPTION OF THE DRAWINGS

Other features and advantages of the present invention will be apparent from the following description taken in connection with the accompanying drawings, wherein:

FIG. 4 shows a format of a sub-data block constituting a sub-data area of each track of FIG. 3;

FIG. 6 shows an arrangement of a pack area;

DESCRIPTION OF THE PREFERRED EMBODIMENTS

Figure 1:
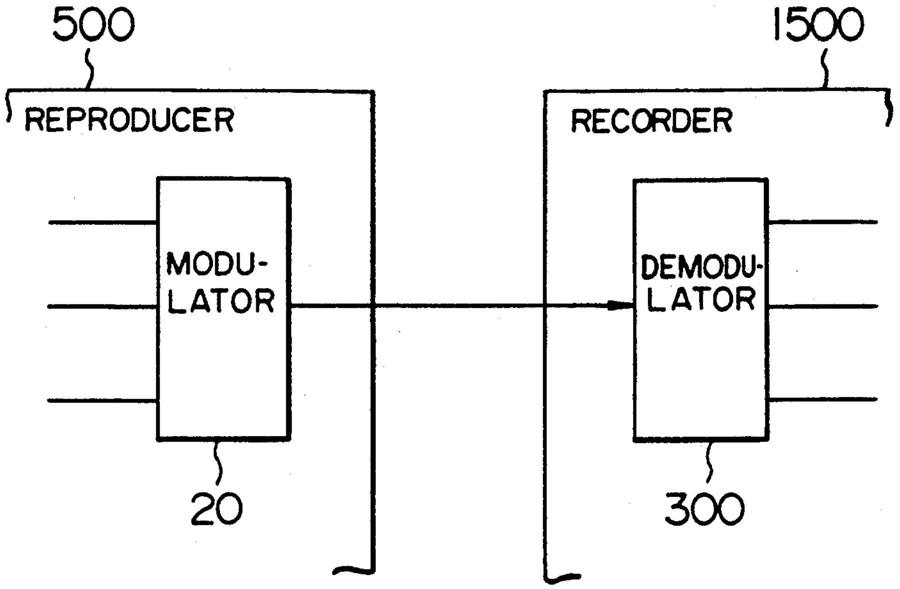
FIG. 1 is a block diagram showing the whole of the PCM signal reproducing/recording apparatus according to the present invention.

FIG. 1 shows that the PCM signal reproducing-/recording apparatus according to the present invention is constituted by a reproducing device 500 including at least a modulation circuit 20, and a recording device 1500 including at least a demodulation circuit 300.

Figure 2:
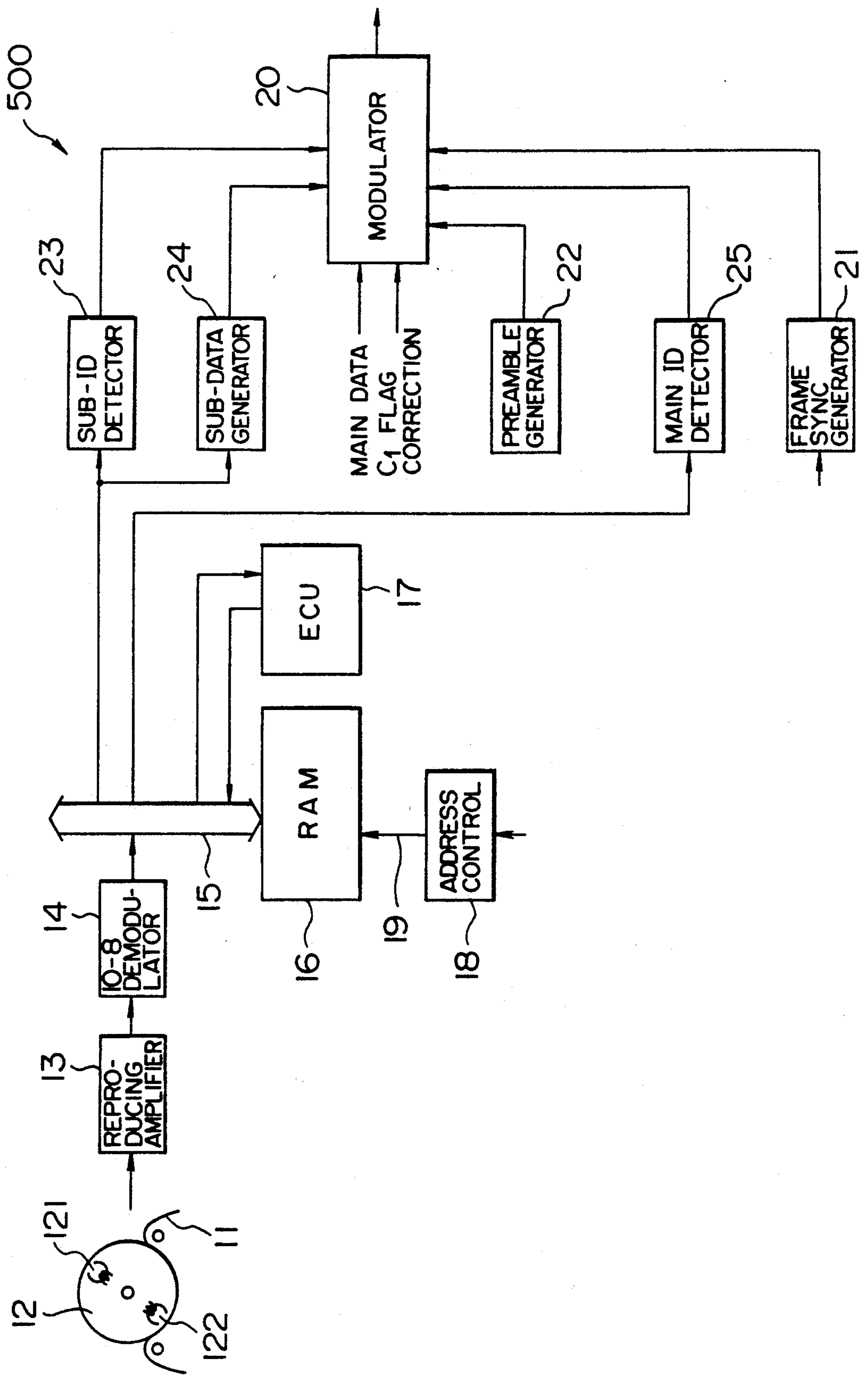
FIG. 2 is a block diagram showing the reproducing device of the PCM signal reproducing/recording apparatus of FIG. 1.

FIG. 2 is a block diagram showing the reproducing device of the PCM signal reproducing/recording apparatus according to the present invention. In FIG. 2, the arrangement includes: a magnetic tape 11 on which main data of PCM audio data, and sub-data, etc., are recorded; a rotary drum 12 having a pair of heads 121 and 122; a reproducing amplifier 13; a demodulation circuit 14; a memory (RAM) 16; an error correction circuit (ECU) 17; and an address control circuit 18. The magnetic tape 11 has a recording format thereon as shown in FIG. 3.

Figure 3:
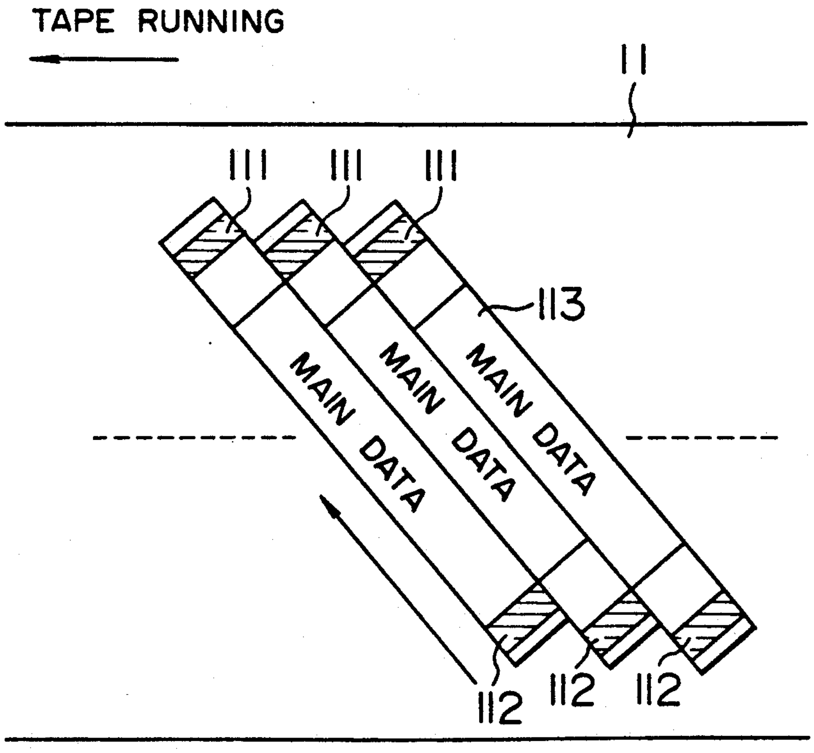
FIG. 3 shows a track format on a magnetic tape to be reproduced by the reproducing device of FIG. 2.

In FIG. 3, the magnetic tape 11 has sub-data area 111 and 112 in which sub-data is recorded and a main data area 113 in which main data composed of PCM audio data is recorded. In each of the sub-data areas 111 and 112, 8 blocks per track, that is, 16 blocks in total, of the sub-data is recorded in each of the sub-data areas 111 and 112, while 128 blocks of main data recorded in the main data area 113.

The format of each of the 16 sub-data blocks forming each of the sub-data areas 111 and 112 is composed of sync. sub-ID (SW1 and SW2), sub-ID parity, and sub-data ($SD_{ij}$, $SP_{ij}$: $i=0 \ldots 15$, $j=0 \ldots 31$). The sync is formed on one symbol, the sub-ID parity is formed on one symbol, and the sub-data is composed of 32 symbols.

Figure 5A:
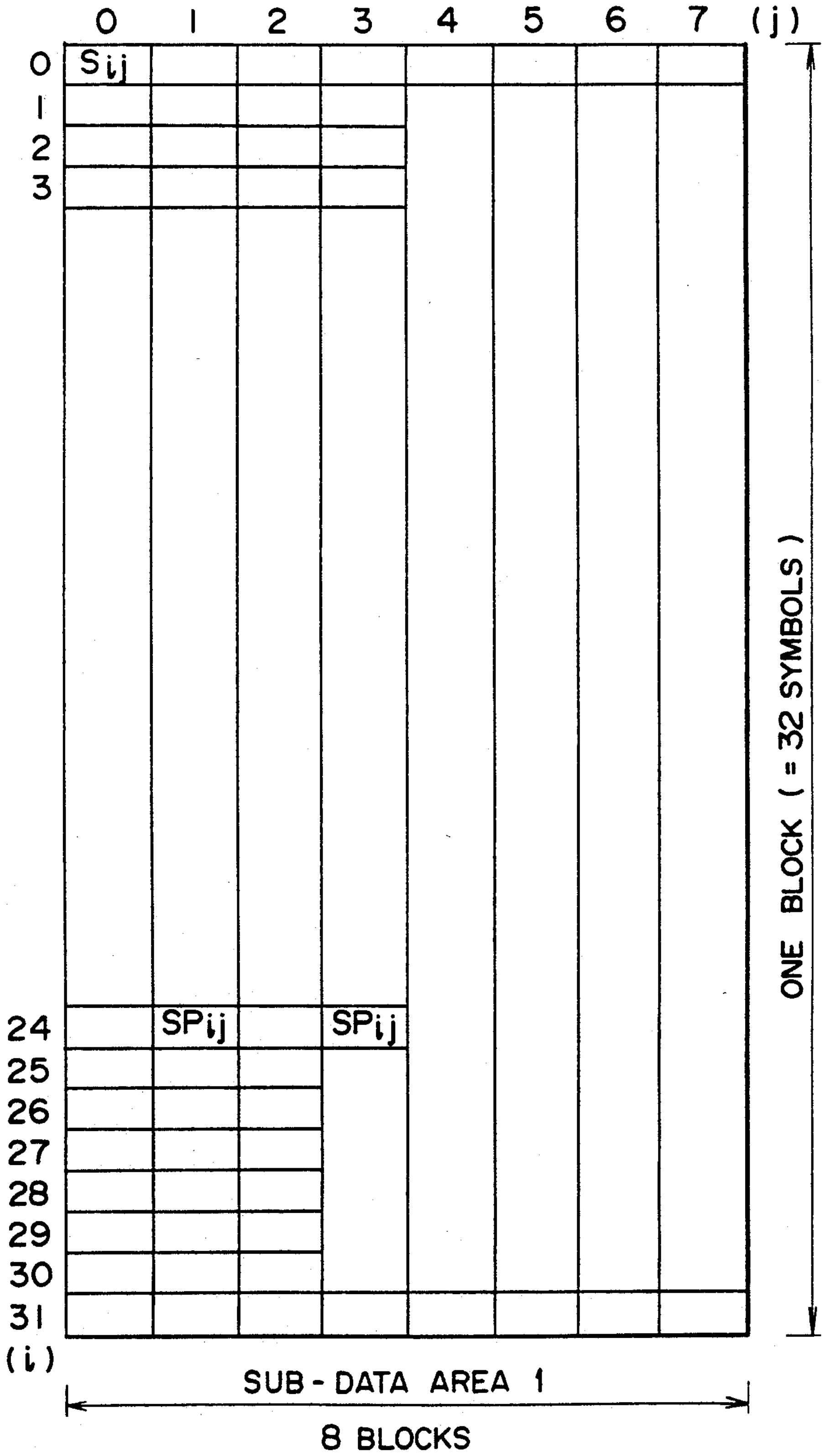
FIGS. 5A and 5B show an arrangement of sub-data per track.
Figure 5B:
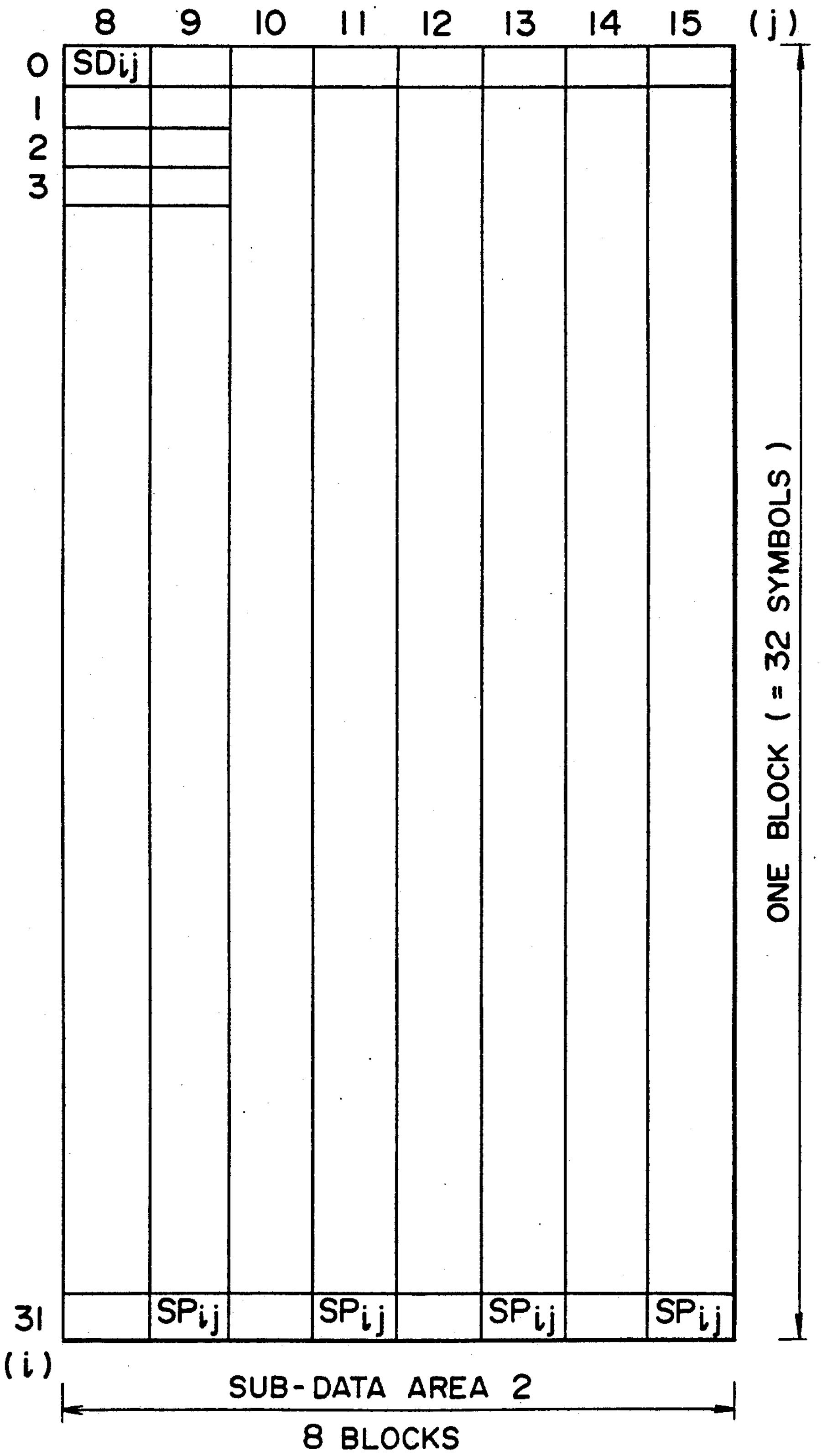

One sub-data block has sub-data of 32 symbols, and the sub-data blocks include two kinds of blocks, one including only data, the other including not only data but parity. The respective symbols have numbers 0 . . . 31 in the order along the direction of record. The sub-data is composed of data ($SD_{0,0}$–$SD_{15,23}$) and parity ($SP_{1,24}$–$SP_{15,31}$) and the sub-data per track has data of 448 symbols and parity of 64 symbols. The parity is used as a code for data error detection and correction. The positioning of the sub-data is as shown in FIG. 5.

Pack ID shows the number of packs included in the sub-data in two blocks starting from an even-numbered block.

When the data ID is "0000", the sub-data is composed of only packs, and the maximum capacity of the sub-data is 7 packs per two blocks. The number of packs used actually is indicated by the pack ID and all the remainder of the pack area of the sub-data is made to be "0".

The pack ID of SW2 indicates the number of packs in the sub-data, and the pack areas 1-7 are arranged as shown in FIG. 6. The pack data is successively recorded in accordance with the area number.

The aforementioned data recorded on the magnetic tape 11 is reproduced by the pair of heads 121 and 122 provided on the rotary drum 12. After being amplified by the reproduction amplifier 13, the reproduced data is demodulated by the 10-8 demodulation circuit 14. The demodulated data is applied to the memory 16 through a data bus 15.

When one frame of data has been recorded in one revolution of the rotary drum 12, the error correction circuit 17 corrects errors in the data by use of the parity (correction code) contained in the data and causes the memory 16 to store $C_1$ correction flag indicating the state of error.

The address control circuit 18 generates a predetermined address signal in synchronism with a predetermined timing signal generated by a not-shown decoder on the basis of a data selection signal. The address signal is applied to the memory 16 through an address bus 19 so that the data stored in the address of the memory 16 designated by the address signal is read out through the data bus 15.

The main data and $C_1$ correction flag read out from the memory 16 are supplied to the interface modulation circuit 20. Other than the main data and $C_1$ correction flag, the respective outputs from a frame sync generation circuit 21, a preamble generation circuit 22, a sub-ID detection circuit 23, a sub-data generation circuit 24, and a main data ID detection circuit 25 are supplied to the interface modulation circuit 20, and then, after being biphase-modulated in the interface modulation circuit 20, are supplied to the recording device 1500 shown in FIG. 14.

Figure 7:
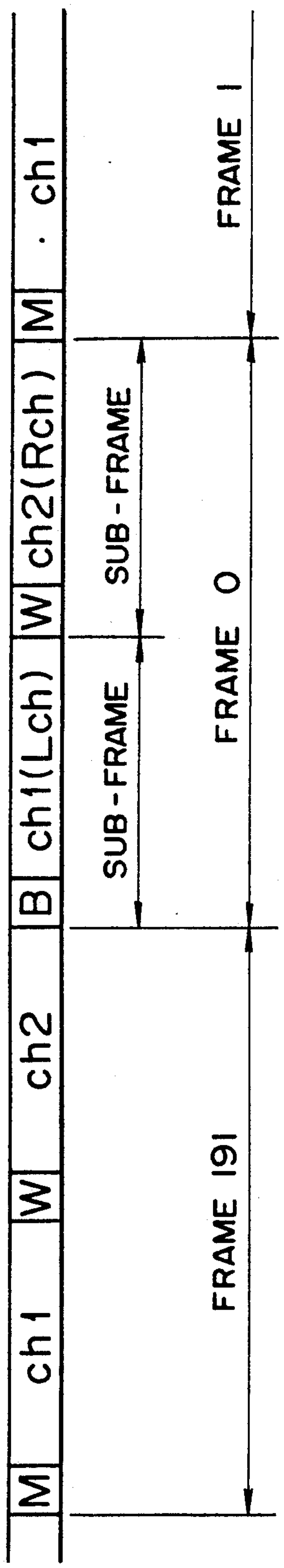
FIG. 7 shows a format of a transmission interface.
Figure 8:
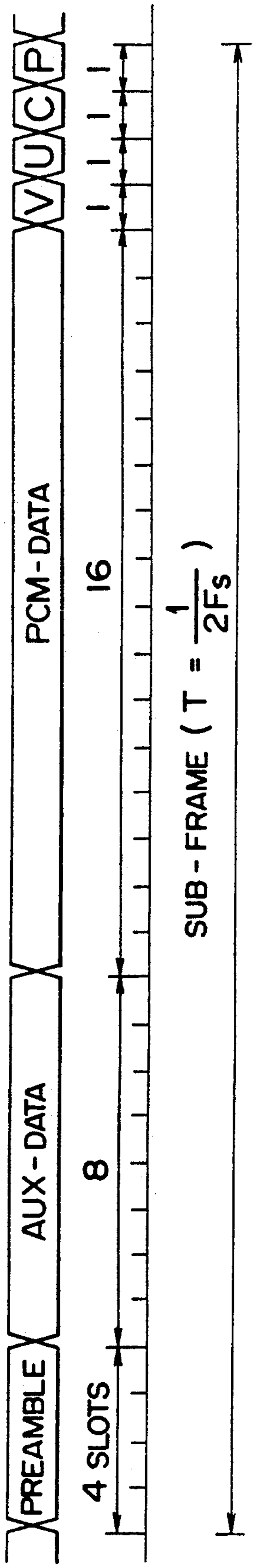
FIG. 8 shows a format of a sub-frame.
Figure 14:
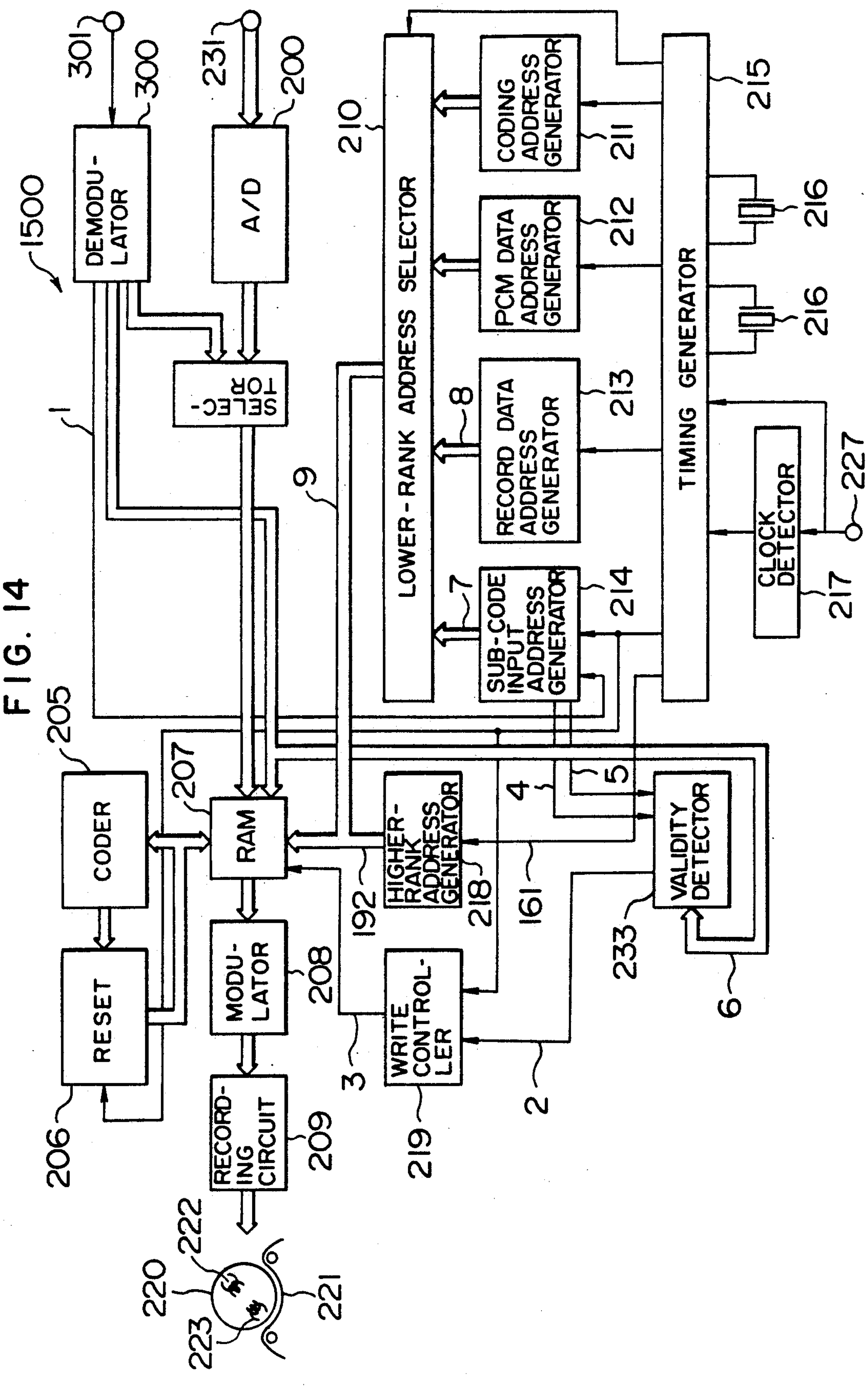
FIG. 14 is a block diagram showing the recording device of the PCM signal reproducing/reproducing apparatus of FIG. 1.

FIG. 7 shows a format of a signal transmitted from the modulation circuit 20 to the recording device shown in FIG. 14. In FIG. 7, the format is composed of 192 frames and each frame is composed of two sub-frames. The format of each sub-frame is composed of a preamble portion to which 4 time slots are allotted, an AUX-DATA portion to which 8 time slots are allotted, a PCM data portion to which 16 time slots are allotted, and a remainder portion of 4 times slots, as shown in FIG. 8 In other words, each sub-frame is composed of 32 time slots. The remainder portion of 4 times slots has a validity indicating bit V, a user's bit U, a channel status bit C, and a parity bit P. The validity indicating bit V, the user's bit U, and the channel status bit C are used by the 192 frames.

Figure 9:
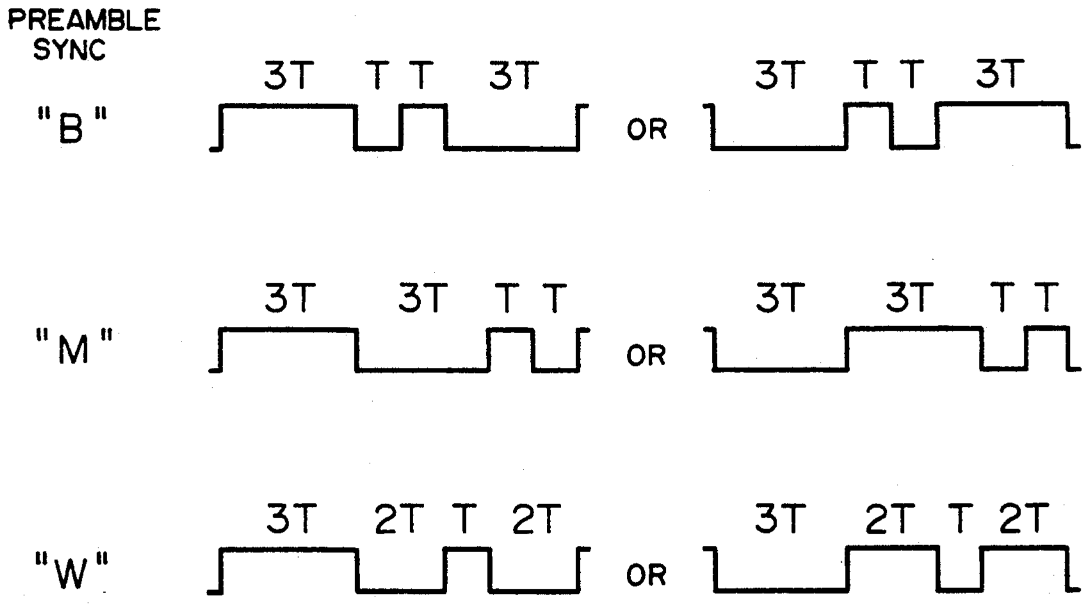
FIG. 9 shows patterns of a preamble of FIG. 8.
Figure 10:
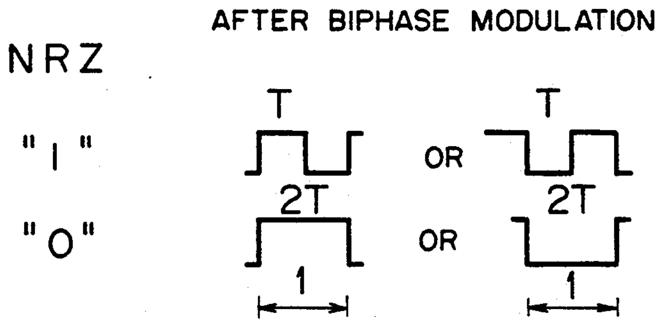
FIG. 10 shows biphase modification.

In the preamble portion, three kinds of patterns B, W and M are included. The pattern B is added to the CH1 at the head of a block, the pattern M is added to the CH1 other than the CH1 at the head of a block, and the pattern W is added to the head of each of the sub-frames CH2, CH3, . . . Those patterns B, W and M have such specific patterns as shown in FIG. 9. The "1" and "0" of NRZ are modulated into biphase patterns with T and 2T as shown in FIG. 10.

Figure 11:
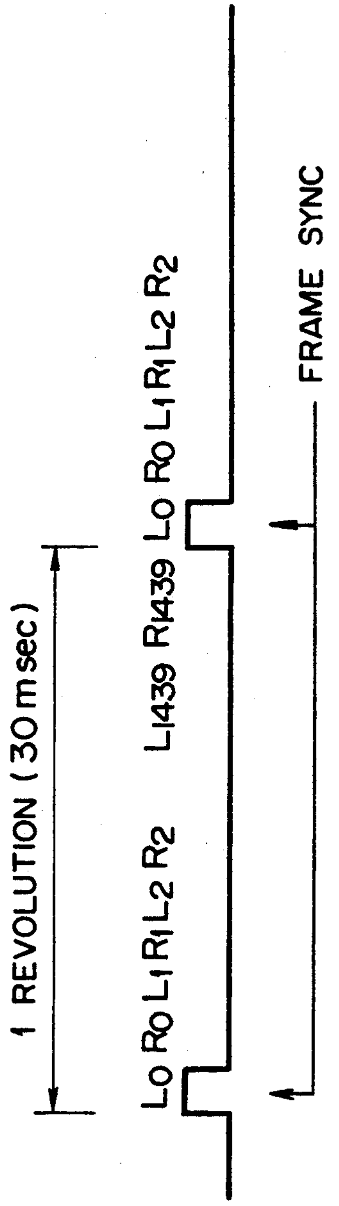
FIG. 11 shows a format of transmission interface for one frame of reproduced data.
Figure 12:
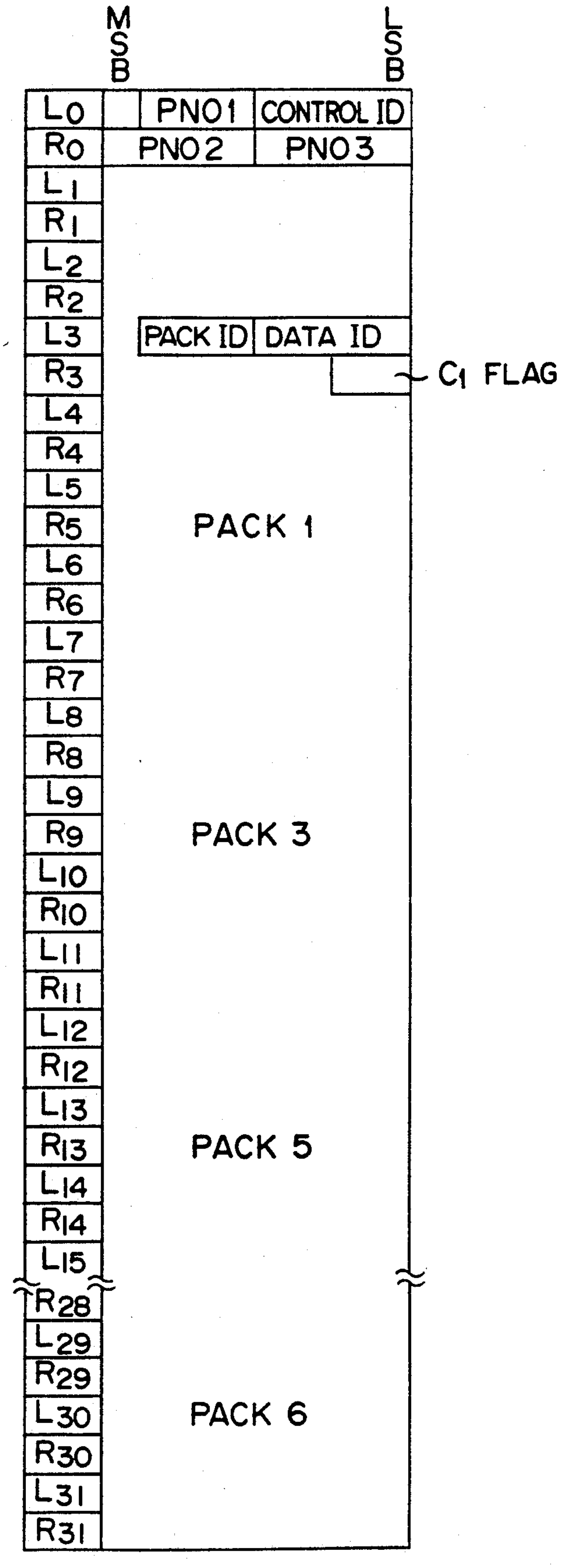
FIG. 12 shows sub-data, sub-ID and main data for two blocks transmitted with the format of FIG. 11.

It is necessary to transmit a signal of 1440 frames during one revolution of the rotary drum 12 when data recorded on the magnetic tape 11 is reproduced and transmitted. FIG. 11 shows the signal format at that time. As shown in FIG. 12, in the first frame in one revolution of the rotary drum 12, main data $L_0$ is allotted to the PCM data portion, and program $NO_1$ of the sub-ID and control ID are allotted to the AUX-DATA portion, in the first sub-frame; and main data $R_0$ is allotted to the PCM data portion, and program $NO_2$ and program $NO_3$ of the sub-ID are allotted to the AUX-DATA portion, in the next sub-frame. In each sub-frame of each of the second and third frames, $L_1$, $R_1$, $L_2$, and $R_2$ are allotted to the PCM data portion and nothing is allotted to the AUX-DATA portion. In the fourth frame, $L_3$ is allotted to the PCM data portion and pack ID of the sub-ID and Data ID are allotted to the AUX-DATA portion in the first sub-frame, and $R_3$ is allotted to the PCM data portion and a $C_1$ flag is allotted to the AUX-DATA portion in the next sub-frame.

Figure 13:
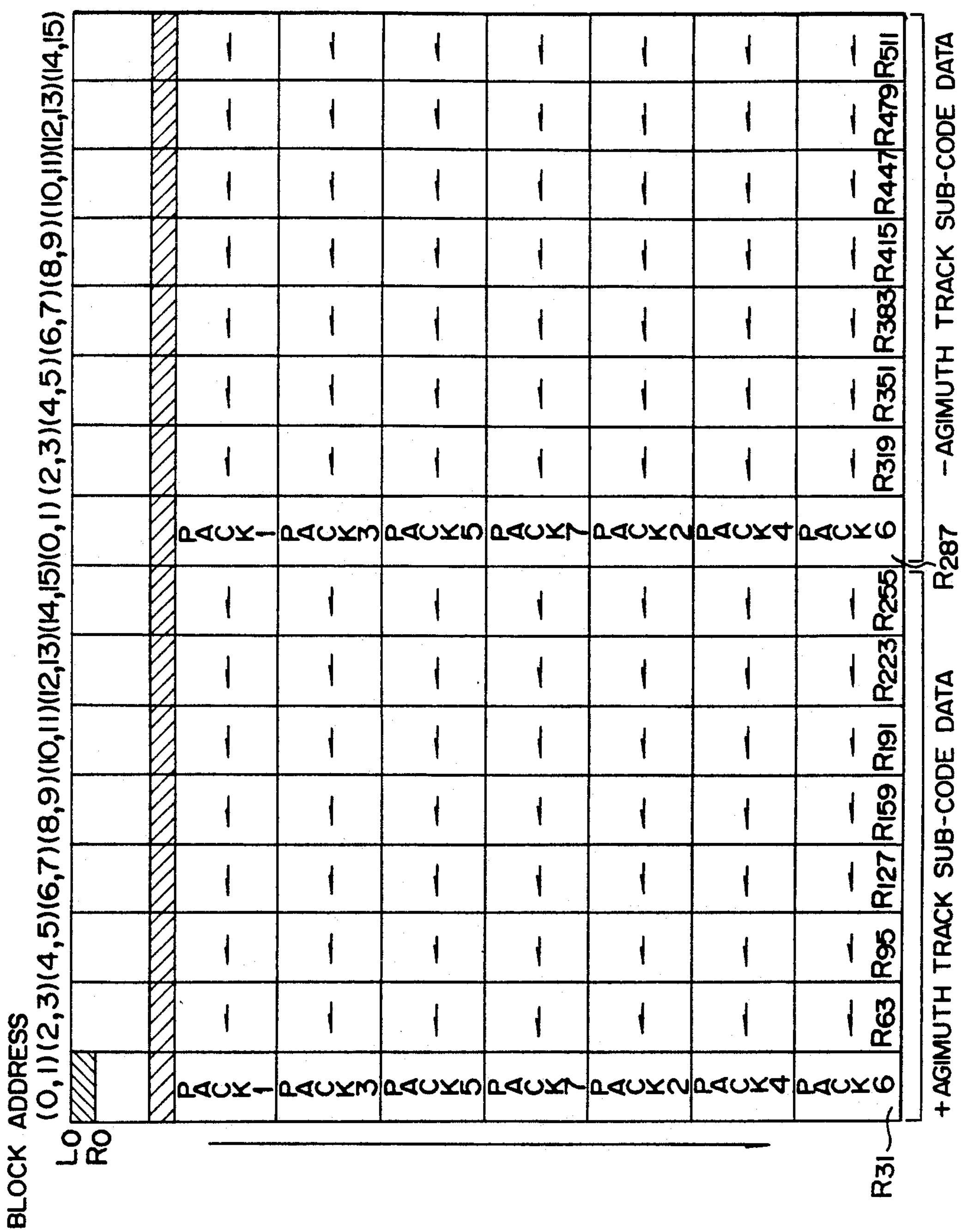
FIG. 13 shows sub-data and sub-ID for one block of reproduced data transmitted with the format of FIG. 11.

In the succeeding sub-frames, main data $L_4, \ldots, L_{31}$, $R_4, \ldots, R_{31}$ are allotted to the respective PCM portions and packs 1, 3, 5, 7, 2, 4, 6 of sub-data are allotted in order to the AUX-DATA portions. Thus, transmission of sub-ID and sub-data for two blocks has been completed. Then, transmission of sub-data for the next two blocks is performed from the 33rd frame. In this case, the program NO and control ID of sub-ID are not transmitted but only the remainder of the sub-ID and sub-data are transmitted as shown in FIG. 13. FIG. 13 shows the sub-ID and sub-data in AUX-DATA portions transmitted in one revolution of the rotary drum, that is, in one frame of reproduced data. Since the control ID of the sub-ID does not change during one frame, only one transmission of the control ID suffices so that the burden on the transmission side as well as the reception side can be reduced.

To perform the above, the frame sync. generation circuit 21 generates a frame sync. in synchronism with the rotation of the rotary drum 12 and the preamble generation circuit 22 generates one of the three kinds of patterns at the head of each sub-frame on the basis of the sync., the pattern being supplied to the modulation circuit 20. Upon detection of the sub-ID in the sub-data read out from the memory 16, the sub-ID detection circuit 23 supplies various ID data of the detected sub-ID to the modulation circuit 20 at predetermined timing at the head of one revolution of the rotary drum and the head of every two blocks of the sub-data. The sub-data generation circuit 24 generates sub-data, that is, pack data 1-7 at predetermined timing on the basis of the data read out from the memory 16 and supplies the thus generated sub-data to the modulation circuit 20. The main data ID detection circuit 25 detects various data on the basis of the data read out from the memory 16 and supplies the detected data to modulation circuit 20 for providing V, U, C and P.

The modulation circuit 20 biphase-modulates the main data which has been read-out from the memory 16 and supplied thereto, and supplies the biphase-modulated main data to the recording device 1500.

FIG. 14 is a block diagram of the recording device 1500 of the PCM signal reproducing/recording apparatus.

The recording device 1500 is provided with a demodulation circuit 300 for demodulating the PCM data (main data) and sub-code data (sub-data, sub-ID, etc.) received from the modulation circuit 20 through a data input terminal 301 and for generating a sub-code input command 1; an A/D conversion circuit 200 for converting an analog signal into a PCM signal; a magnetic tape 221; a rotary cylinder 200; heads 222 and 223; a recording circuit 209 constituted by a recording amplifier and so on; a modulation circuit 208; a RAM 207 which is a storage circuit for temporarily storing data and which has a capacity of 256 Kbits; a coding circuit 205 for generating parity; a reset circuit 206 for zero-resetting the input data to the RAM 207; a write control circuit 219 for sending a write command to the RAM 207; a higher-rank address generation circuit 218 for controlling the higher-rank three bits of the address of the RAM 207; a coding address generation circuit 211 for controlling the lower-rank address of the RAM 207 so as to generate parity in the coding circuit 205; a PCM data address generation circuit 212 for controlling the lower-rank address of the RAM 207 when an input is made into the RAM 207 from the A/D conversion circuit 200; a recording data address generation circuit 213 for controlling the lower-rank address of the RAM 207 when an output is made from the RAM 207 into the modulation circuit 208; a sub-code input address generation circuit 214 for controlling the lower-rank address of the RAM 207 when a sub-code input is made into the RAM 207; a sub clear timing generation circuit for generating a timing for clearing the sub-code area of the RAM 207; a timing generation circuit 215 for controlling the operational timing of the various circuits 1, 211–214, and so on; a lower-rank address selection circuit 210 for selecting the lower-rank address of the RAM 207; a crystal oscillator 216; a clock detection circuit 217 for detecting existence of an external clock; an audio signal input terminal 23; an external clock input terminal 227; and a validity detection circuit 233 for detecting whether a specific data of the sub-code is "0" or not.

First, the operation of the recording device 1500 of FIG. 14 will be described.

An analog signal is supplied through the audio signal input terminal and converted into a PCM signal by the A/D conversion circuit 200. The thus converted PCM signal is stored in the RAM 207 at the address controlled by the PCM data address generation circuit 212. Data is read out from the RAM 207 with the address controlled by the coding address generation circuit 211, and parity is generated by the coding circuit 205 and written into the RAM 207. Then, under control by the recording data address generation circuit 213, data is read out from the RAM 207, modulated in the modulation circuit 208, amplified in the recording circuit 209, and recorded on the magnetic tape 221 by the heads 222 and 223.

On the other hand, the sub-code data is supplied from the demodulation circuit 300, stored in the RAM 207 with the address controlled by the sub-code input address generation circuit 214, subject to the same processing as above, and recorded on the magnetic tape 221.

Figure 15:
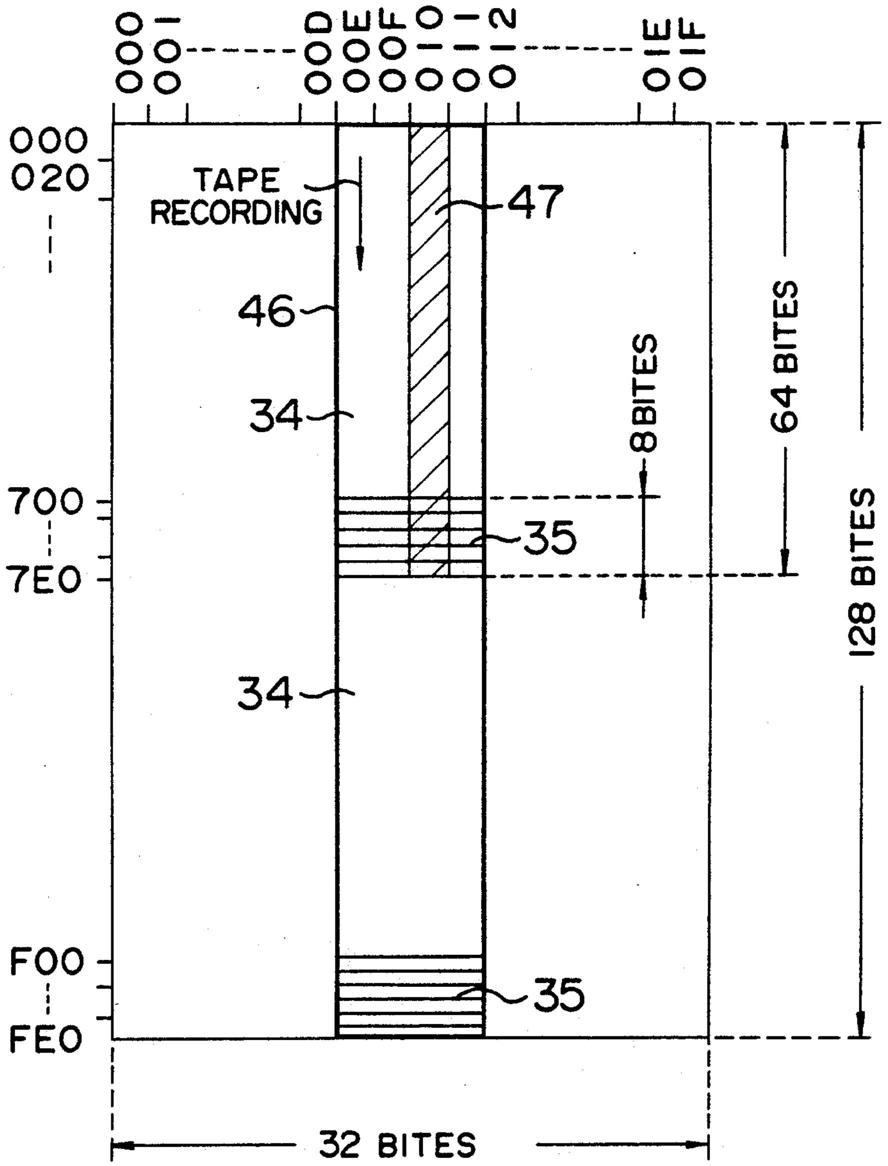
FIG. 15 shows an RAM map of a storage circuit of the recording device of FIG. 14.

In the RAM 207, on the other hand, sub-code data 34 and $C_1$ parity 35 are stored in the above operation. FIG. 15 is an RAM map showing the region where those sub-code data 34 and $C_1$ parity 35 are stored. FIG. 15 shows the data storage region of one track and this one face has a capacity of one track. The sub-code is stored in the central region indicated by a thick solid line 46. In this region, data is stored in the vertical direction along the direction of recording on the tape. This region is composed of 512 bites arranged in four columns. In FIG. 15, the coordinates represent the address of the RAM 207 with hexadecimal notation.

The region 34 is used also as a region for the $C_2$ parity for the PCM data, and in the actual case of write, after PCM data has been written on the magnetic tape 221 succeeding PCM data is inputted and written in the interval before parity is generated.

A hatched region 47 is called a sub-code write-in region which will be described later.

In the recording device 1500, of the sub-code data transmitted by the two tracks with the format shown in FIGS. 12 and 13, only one set of sub-code data consisting of check bit, data ID, and $C_1$ flag all of which are "0" are written in octuple onto the magnetic tape 221.

In this case, as data showing the fact that the sub-code is correct, there is used are a check bit showing that SW1 and SW2 have been reproduced correctly, a $C_1$ flag showing that the sub-code data 34 has been reproduced correctly, and a data ID the whole of which is written as "0".

The operation of the recording device of FIG. 14 in recording data will be described hereunder.

Sub-code input command 1 is supplied from the demodulation circuit 300 and sub-code data is also inputted from the demodulation circuit 300 in synchronism with the sub-code input command 1. The sub-code input address generation circuit 214 detects the timing of input of the ID data and flag data and sends detection commands 4 and 5 to the validity detection circuit 233 which checks whether all the check bit, data ID and $C_1$ flag are "0" or not. The validity detection circuit 233 sends a "0" detection signal 2 to the write control circuit 219 which transfers a write command 3 to the RAM 207 so that the RAM 207 stores the sub-code data. At that time, the sub-code input address generation circuit 214 makes access only to a specific region composed of 64 bites so that a write operation is carried out at a specific address independently of the position of valid sub-code data. The region is called a sub-code write-in region. Upon detection of completion of transfer of the sub-code data of two tracks (64 bites) by the sub-code input address generation circuit 214, the validity detection circuit 233 is controlled to stop the "0" detection signal 2 so as to reset the write command 3 to thereby terminate the storing operation into the RAM 207. Upon completion of input of the sub-code data of two tracks (1024 bites), the validity detection circuit 233 returns into a reset state and then performs validity detection.

Through the above operation, one set of data including check bit, data ID and $C_1$ all of which are "0" have been written in the sub-code write-in region of the RAM 207.

In recording on the tape, the recording data address generation circuit 213 is caused to repeatedly make access only to the sub-code write-in region 47 so that the sub-code data is read out from the region 47 and recorded in the sub-code recording area on the tape. Thus, valid data can be recorded in octuple on the tape.

As described above, in the recording device 1500, it is possible to prevent recording of sub-code data having errors and sub-code data having a format other than a specified one.

Figure 16:
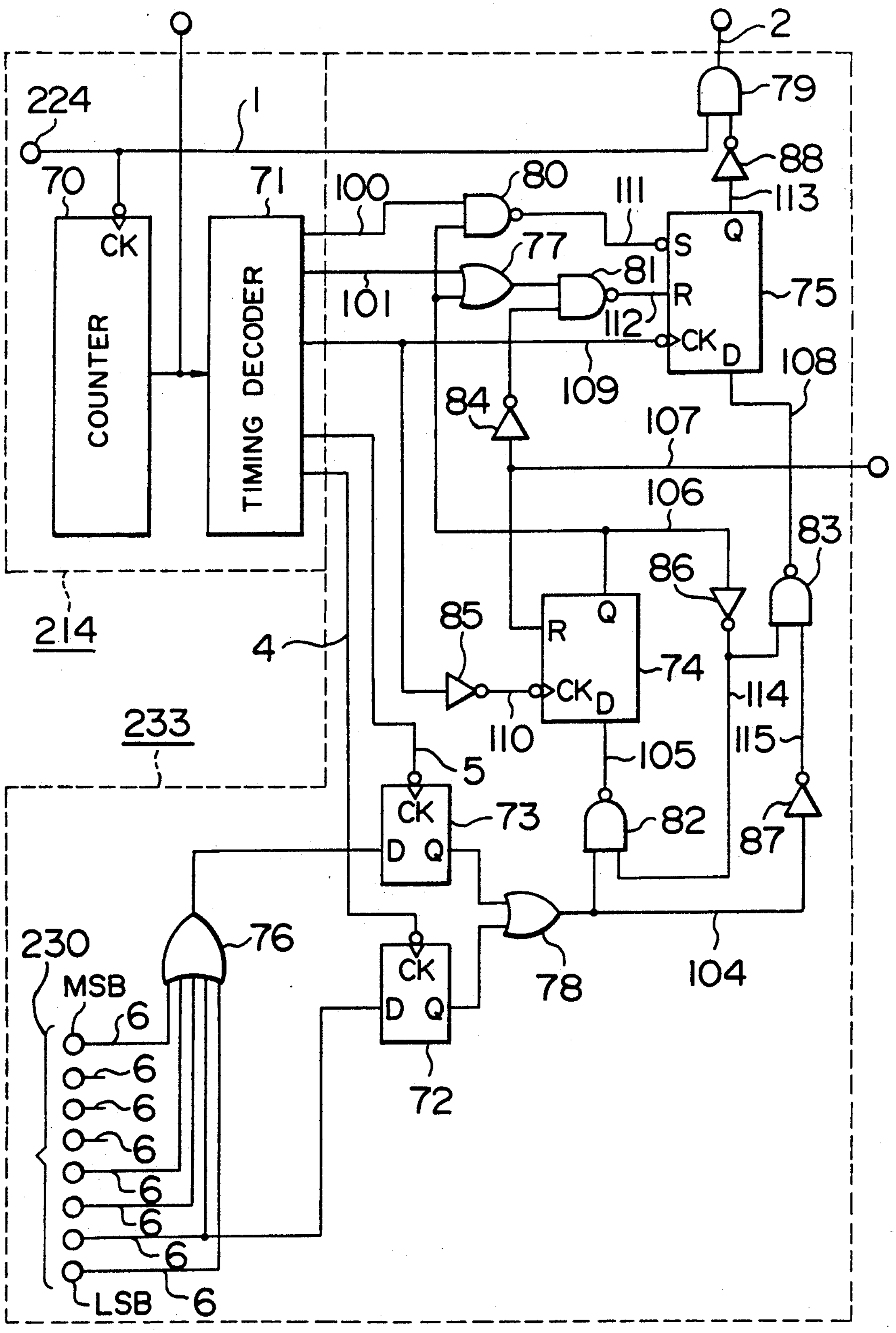
FIGS. 16 and 19 are circuit diagrams each showing an arrangement of a higher-rank address generation circuit and a validity detection circuit in the recording device of FIG. 14.

FIG. 16 shows an example of the sub-code input address generation circuit 214 and the validity detection circuit 233. In FIG. 16, the sub-code input address generation circuit 214 includes a counter 70 and a timing decoding circuit 71 for deriving a necessary timing from the counter 70, and the validity detection circuit 233 includes latches 72–75, OR circuits 76–78, an AND circuit 79, NAND circuits 80–83, and inverters 84–88. The reference numeral 5 represents a clear signal. Each of the counter 70, and the latch circuits 72–75 is actuated to operate at a trailing edge of a clock. The resetting of the latch circuits 74 and 75 is actuated by a high level and the setting of the latch circuit 75 is actuated by a low level. The Q-output signal 113 of the latch circuit 75 is inverted by the inverter 88 so that the sub-code input command 1 is gated by the AND circuit 79 and transferred as a "0" detection signal 2 to the write control circuit 219. Accordingly, control is effected so that the input sub-code data is written into the RAM 207 when the signal 113 is at a low level, while the write operation is inhibited when the signal 113 is at a high level.

The reference numerals 5 and 4 represent a latch clock for ID data check and a latch clock for flag data check.

Further, "LSB" and "MSB" labeled at the input sub-code data 6 represent the least significant bit and the most significant bit respectively.

Figure 17:
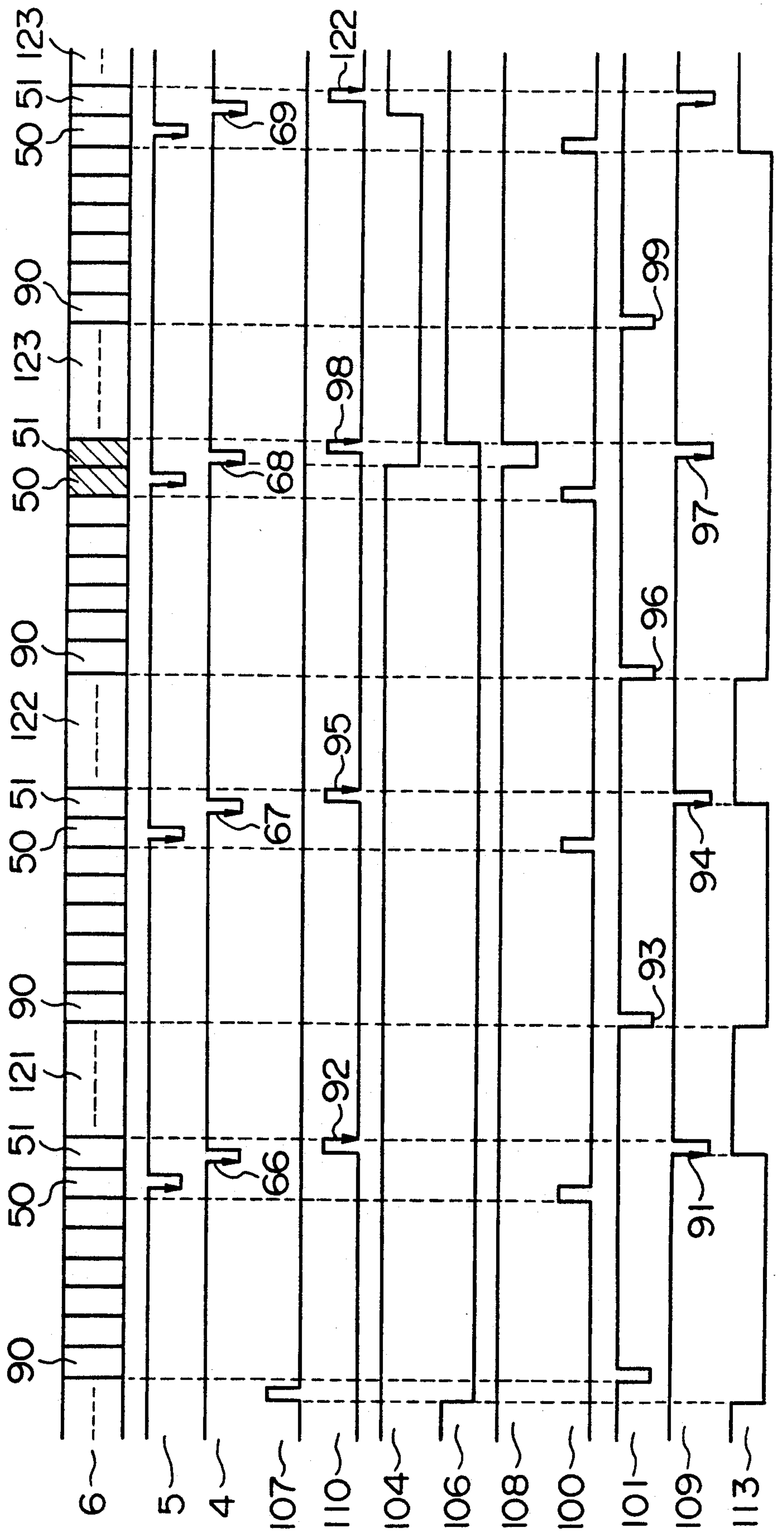
FIG. 17 is an operation timing chart of the address generation circuit of FIG. 16.

Referring to the timing chart of FIG. 17, the operation of the circuit in FIG. 16 will be described hereunder. FIG. 17 shows the operation in the case where only the third set of ID data and flag data are indicated to be valid (hatched data).

Upon input of the clear signal 107, the latch circuits 75 and 74 are reset because the signal 101 is high, the signals 106 and 113 become low, and the input sub-code data 6 is written in the RAM 207.

At a timing 66 in a latch clock 4, if any of a check bit 61, a data ID 41, and a $C_1$ flag is "1", the high level is latched by the latch circuit 72 or 73, the output 104 of the OR circuit 78 is made high, and the output 115 of the inverter 87 is made low, so that the output 108 of the NAND circuit 84 becomes high. Accordingly, the high level is latched by the latch circuit 75 at a trailing edge 91 of a signal 109, and the signal 113 becomes high to thereby inhibit writing in the RAM (hereinafter referred to as "RAM write"). The output 105 of the NAND circuit 82 is low, so that the signal 106 is left as it is at a low level at a trailing edge 92 of a signal 110.

Thereafter, the latch circuit 75 is reset by the low section of the signal 101, the signal 113 becomes low, and the RAM write operation is started.

As described above, the RAM writing of a sub-code data 121 located between the edge 91 and the section 93 can be inhibited. By operating the timing 67, 94, 95, and 96 similarly, the RAM writing of a sub-code 122 can be inhibited.

If all the check bit, the data ID, and the $C_1$ flag are "0" at a timing 68, both the latch circuits 72 and 73 latch the low level, so that the signal 104 is changed to low. Accordingly, the signals 105 and 115 become high, the signal 108 becomes low, and the low level is latched at a trailing edge 97 of the signal 109, so that the signal 113 is left low as it is. Accordingly, the state of RAM writing is maintained. The output 106 of the latch circuit 74 and the signal 114 become high and low respectively at a trailing edge 98 of the signal 110, so that the level of the signal 105 is not influenced by the signal 104 until the clear signal 107 is inputted to reset the latch circuit 74.

Thereafter, in a high section 120 of a signal 100, the signal 106 is high, the latch circuit 75 is set, and the signal 113 becomes high, so that the RAM write operation is inhibited. Then, the signal 106 is high, so that the latch circuit 75 is not reset by the signal 101, and the signal 113 is kept high independently of the level of the signal 104.

As described above, ID data 50, flag data 51 (portions hatched with oblique lines), and sub-code data 123 can be written in the RAM 207, and then the sub-code data 123 is never rewritten until the clear signal 107 is produced. Although six data between the timing 99 through 120 are arranged to be written in the RAM 207, all the first six-data are "1", so that there is a problem.

Figure 18:
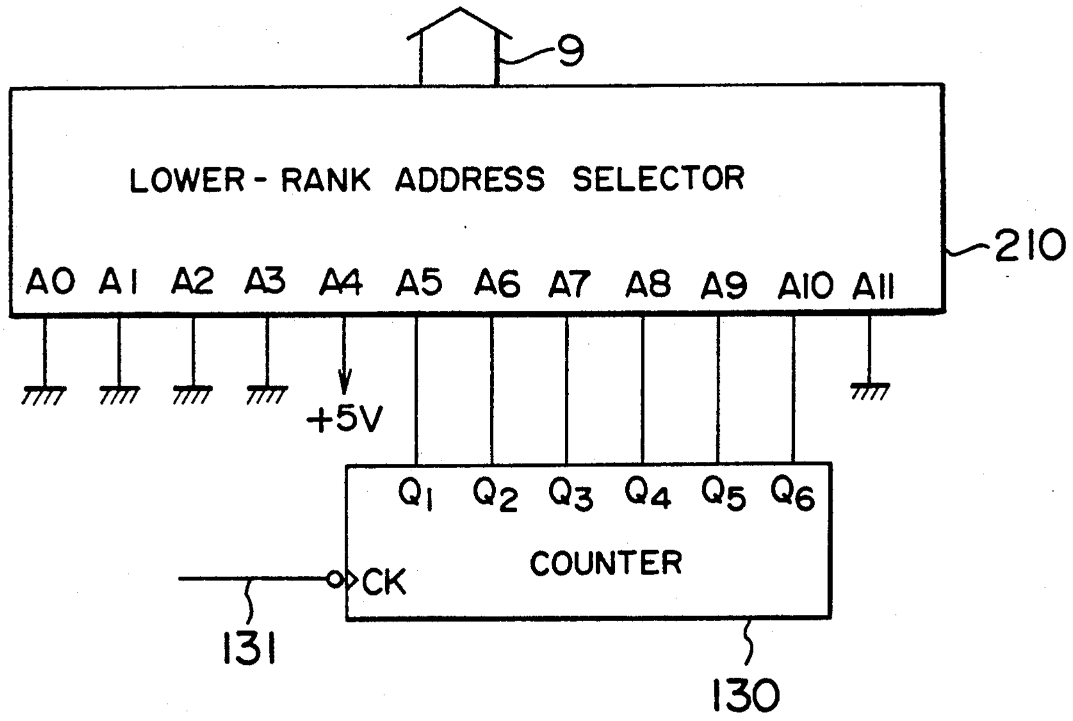
FIG. 18 is an address chart for octer-writing.

FIG. 18 shows an example of the circuit for making access to the sub-code write region 47 of the RAM 207 of FIG. 15. In FIG. 18, there is provided a counter 130 of 6 bits in which the least significant bit and the most significant bit are represented by $Q_1$ and $Q_2$ respectively. The lower-rank address selection circuit 210 has input of 11 bits in which the least significant bit and the most significant bit are represented by $A_0$ and $A_{11}$. The counter 130 has a terminal which receives a data access command signal 131 corresponding to, for example, a sub-code input command 1 in the sub-code input address generation circuit 214.

By fixedly maintaining the input bits $A_0$ through $A_3$ and $A_{11}$ at a low level and the input bit $A_4$ at a high level, access can be made to the address only in the sub-code write region 47 of the RAM 207.

Figure 19:
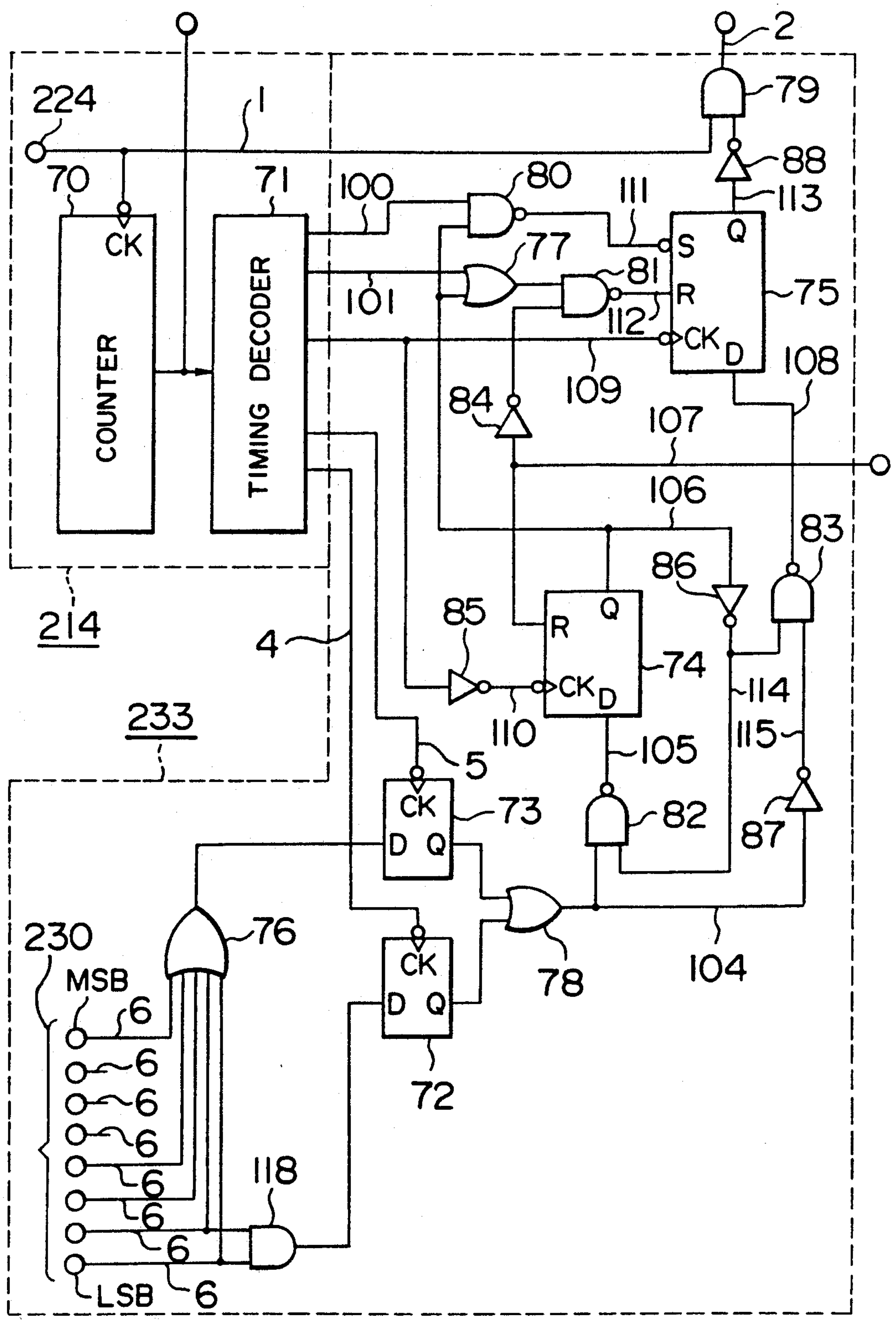

In the embodiment described above, data has been judged to be valid when the $C_1$ flag is "0". This means that data is considered to be valid when judgement proves that no error exists or one bite correction is executed in $C_1$ correction. However, the standard for determining validity of data may be changed. For example, in the case where data should be considered valid only when judgement proves that correction cannot be made in $C_1$ correction, such a circuit as shown in FIG. 19 may be used. In FIG. 19, the circuit includes an AND circuit 118.

A $C_1$ parity 35 is added in performing coding to the region of the RAM 207 in which the ID data 50 and the flag data 51 have been stored. Accordingly, it is necessary to read out the ID data 50 and the flag data 51 before coding is carried out. In order to read out the data prior to the coding, however, it is necessary to provide another storage circuit. If the ID data 50 and the flag data 51 are rewritten to an unused region in the RAM 207 by using RAM access for parity generation by controlling the coding address generation circuit 211 and the higher-rank address generation circuit 218, the additional provision of the storage circuit can be avoided.

Figure 20:
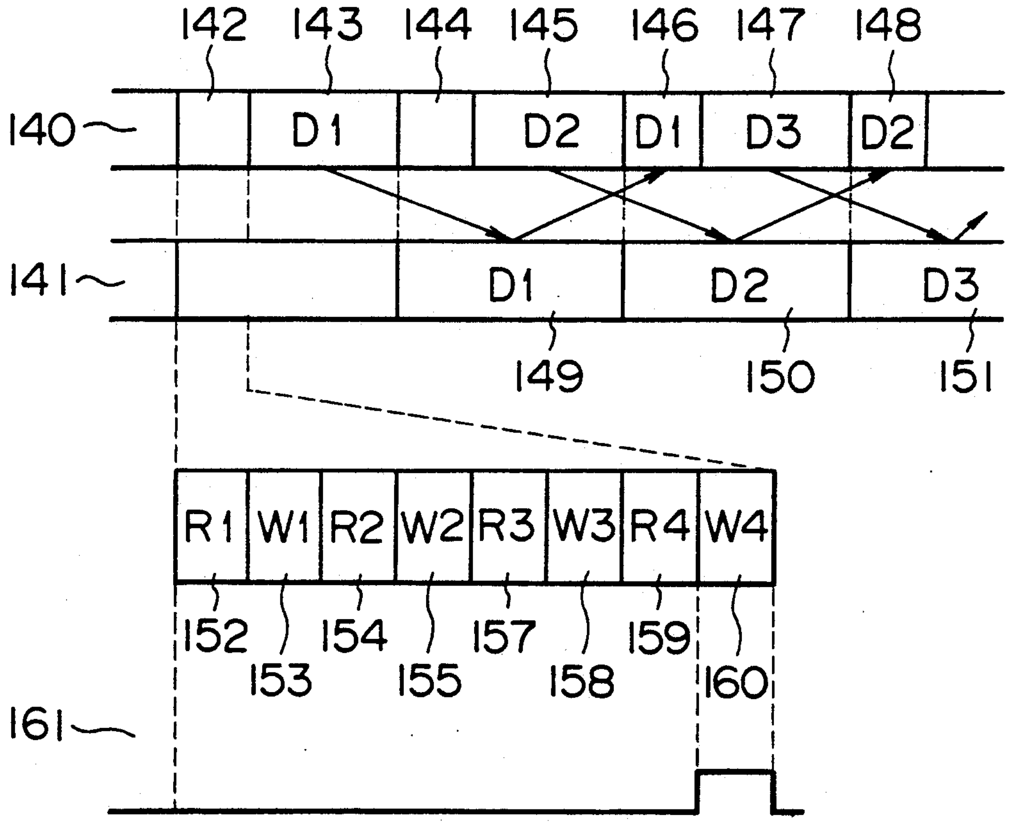
FIG. 20 is a timing chart for coding.

FIG. 20 is a timing chart in the coding operation performed in the coding circuit 205. Data exchange between the coding circuit 205 and the RAM 207 is executed at timings on a time belt 140, while coding processing is executed at an operation time belt 141.

Data $D_1$ of one system and 32 words is supplied to the coding circuit 205 from the RAM 207 at a timing 143 on the time belt 140, subject to operational processing at a timing 149 on the time belt 141, and then is written into the $C_1$ parity region 35 of the RAM 207 at a timing 146 on the time belt 140. Thereafter, parity generation is performed at similar timings. Parity write timings 142, 144, 146, and 148 on the time chart 140 are shown as a write timing 160. Numerals 152, 154, 157, and 159 represent read timings from the RAM 207, while numerals 153, 155, 158, and 160 represent write timings into the RAM 207. Of those timings, the timings 158 and 159 relate to the ID data 50 and the flag data 51, and the access of the ID data 50 and the access of the flag data 51 are performed at the timings 142 and 144 respectively. If the higher-rank address of the RAM 207 is changed-over in the RAM writing operation 159 at the timings 142 and 144, the data 50 and 51 can be rewritten so that this data can be retained in another region even if parity generation is performed thereafter.

Figure 21:
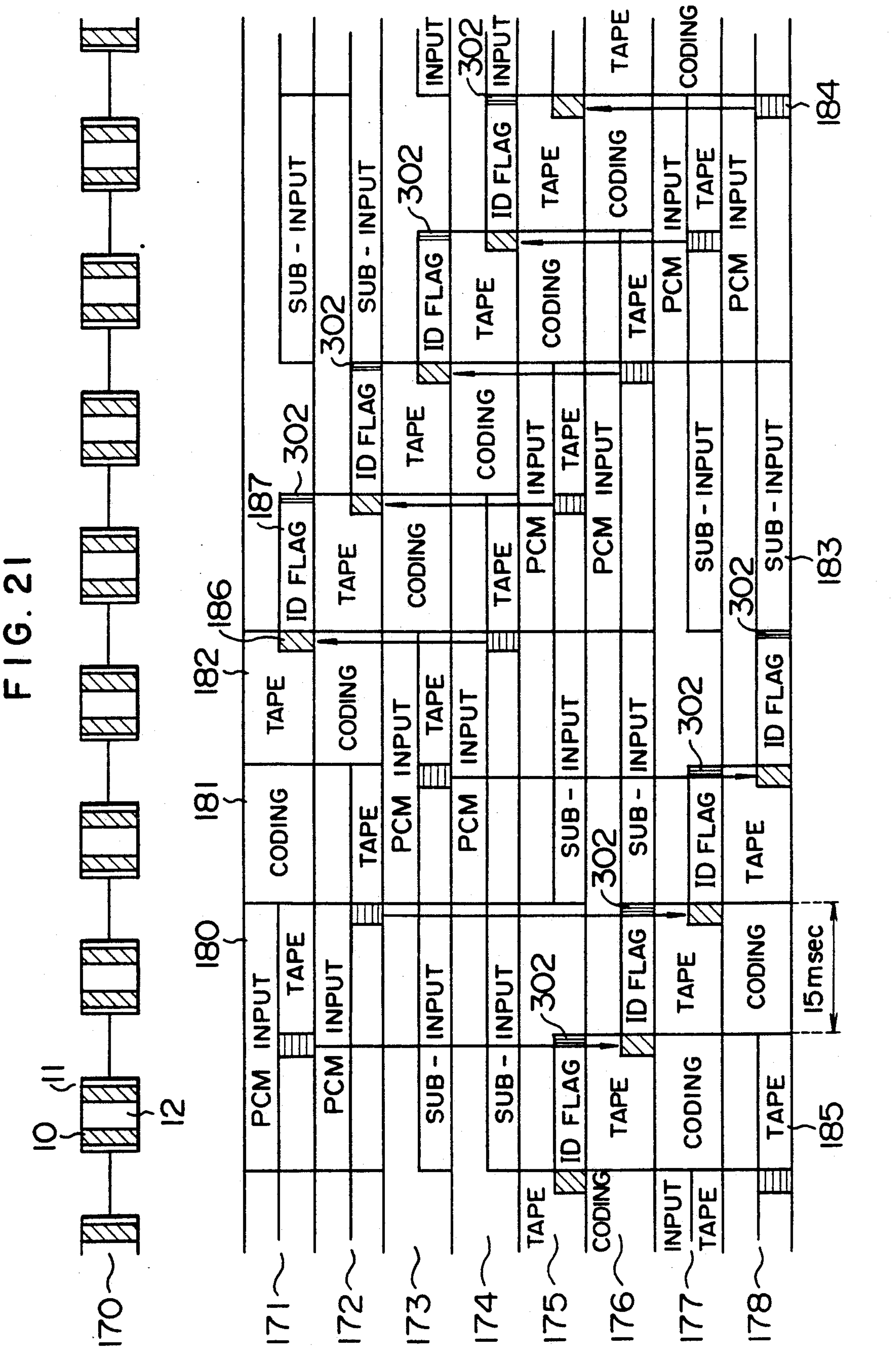
FIG. 21 is a timing chart for higher-rank addresses.

FIG. 21 is a time chart showing an example of address timings for the data rewriting described above, in which broken lines show a period of time (15 msec) during which the rotary cylinder 220 is rotated by 180 degrees. FIG. 21 shows the timings in case where the RAM 207 has a capacity of 256 Kbits. In the case of the RAM of 256 Kbits, it is possible to provide eight faces of regions, one being shown in FIG. 15. Operational timings on the respective faces are shown on time belts 171 through 178. There are provided a timing 180 at which PCM data from an A/D converter 200 is written, a timing 181 at which coding is performed in the coding circuit 205, a timing 182 at which the PCM data is recorded on the magnetic tape 221, a timing 183 at which sub-code data from the demodulation circuit 300 is written, a coding timing 184 (portion hatched with horizontal lines), a timing 185 at which the sub-code data is recorded on the magnetic tape 221, a timing 186 (portion hatched with oblique lines) at which the ID data 50 and the flag data 51 are rewritten, and a timing 187 at which the ID data 50 and the flag data 51 are recorded on the magnetic tape 221.

As shown in FIG. 21, the ID data 50 and the flag data 51 are rewritten into the unused region, so that recording can be performed without increasing storage circuits.

Figure 22:
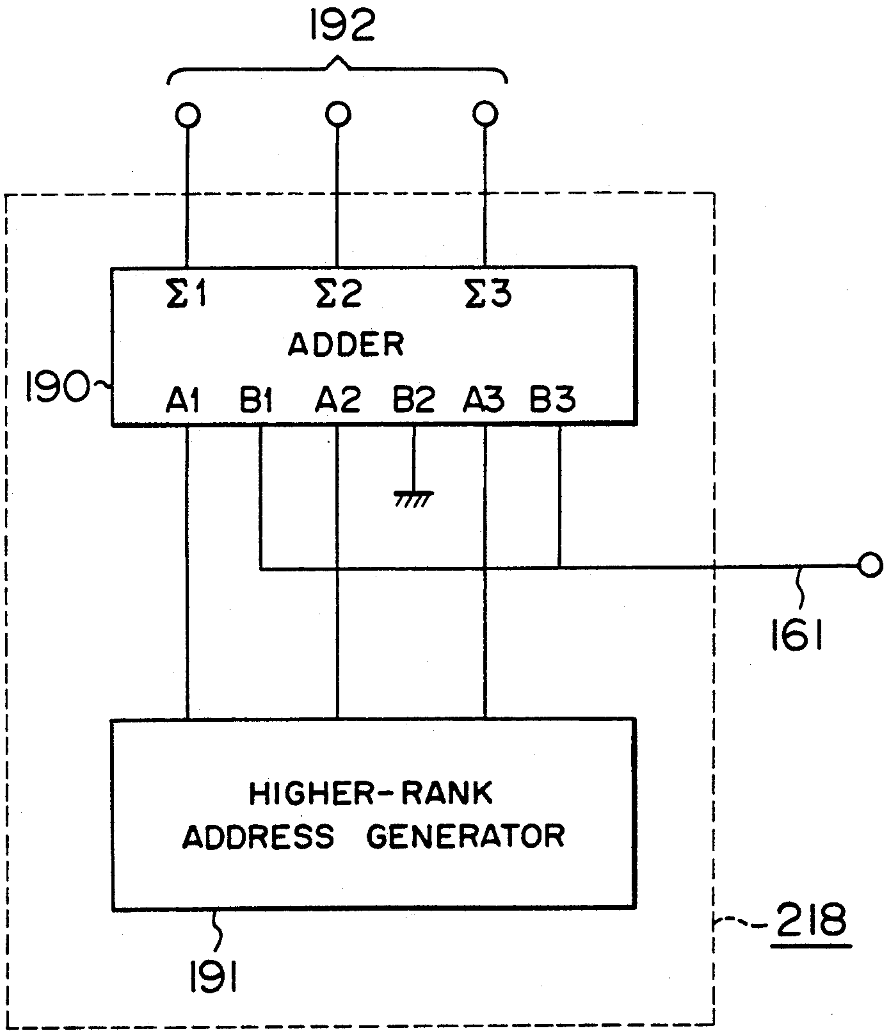
FIG. 22 is a diagram showing an arrangement of the higher-rank address generation circuit.

FIG. 22 shows an example of the higher-rank address generation circuit 218 for performing the data rewriting shown in FIG. 21. It is assumed that the time belts 171 through 178 in FIG. 21 correspond to the address of the higher-rank bits 0 through 7. In FIG. 22, the higher-rank address generation circuit 218 is constituted by a 3-bit adder 190 and a higher-rank address generator 191. A B-input of the adder 190 becomes 5 in decimal representation in the period in which a timing signal 161 shown in FIG. 20 is in a high level, so that the ID data 50 and the flag data 51 can be written at the address of the RAM 207 corresponding to the time belts 171–178 shown in FIG. 21.

Just before the sub-code data is stored in the RAM 207 at the sub-code input timing 183 shown in FIG. 21, the $C_2$ parity generated at the coding timing 181 and the ID data 50 and the flag data 51 which have been rewritten at the rewriting timing 186 have been written in the sub-code region 46 shown in FIG. 15. If there exists no valid data in the received ID data 50 and flag data 51 of one track (for example, when it becomes impossible to reproduce data over one track in the reproducing device due to dropout or any other reason), new sub-code data is not written in the sub-code write region 47 of the RAM 207. Accordingly, in such a condition, the $C_2$ parity, etc. are erroneously recorded on the magnetic tape 221 as sub-code data at the sub-code record timing 185.

If "0" data is written, by using the reset circuit 206, in both the sub-code region 46 and the sub-code write region 47 at sub-code clear timings 302 shown in FIG. 21, the above-mentioned $C_2$ parity, etc. can be cleared, so that the "0" data is recorded on the magnetic tape 221 as the sub-code data even when there exists no valid data in the input sub-code data over one track to thereby make it possible to solve the problem described above.

We claim:

1. A PCM signal reproducing apparatus comprising:
a reproducing device for reproducing PCM data and sub-code data, said sub-code data having sub-data and sub-ID for adding auxiliary information to said PCM data, in which said reproducing device includes data transmission means for producing a transmission signal having at least a preamble portion, an AUX-DATA portion and a PCM data portion related to each PCM data of one word and in which said sub-code data and PCM data reproduced from said reproducing device are arranged respectively in said AUX-DATA portion and PCM data portion of said transmission signal, said AUX-DATA portion further having arranged therein a flag to show a state of correction of said sub-code data, and for subjecting the transmission signal to bi-phase modulation for transmission to a recording device.

2. A PCM signal reproducing apparatus according to claim 1, in which the arrangement of said sub-data and sub-ID into said AUX-DATA portion is performed for each frame.

3. A PCM signal reproducing apparatus according to claim 1, in which said reproducing device produces a sub-ID including program NO and control ID and transmits said program NO and control ID only once for every frame.

4. A PCM signal reproducing apparatus according to claim 1, in which said reproducing device performs the data transmission with a flag arranged in said AUX-DATA portion to show a state of sub-data correction.

5. A PCM signal recording apparatus comprising a recording device for recording PCM data and sub-code data having sub-data and sub-ID for adding auxiliary information to said PCM data, in which said recording device includes:
a storage circuit for temporarily storing said sub-code data;
a validity detection circuit for judging specific data indicating whether said sub-code data is correct or not;
a write control circuit for sending a write command to said storage circuit in accordance with a result of judgement by said validity detection circuit;
a sub-code input address generation circuit for controlling addresses of said storage circuit so as to store said sub-code data in a specific region of said storage circuit; and
means for storing only correct sub-code data detected by said validity detection circuit.

6. A PCM signal recording apparatus according to claim 5, said recording device further including:
a record data address generation circuit for controlling the addresses of said storage circuit so as to read out said sub-code data stored in said specific region of said storage circuit, N-times repeatedly from said storage circuit; and
means for recording said sub-code data stored in said specific region of said storage circuit onto the recording medium N-times.

7. A PCM signal recording apparatus according to claim 5, said recording device further including means for writing zero data into said specific region of said storage circuit prior to storing of said sub-code data into said specific region of said storage circuit.

8. A PCM signal reproducing/recording apparatus comprising:

a reproducing device for reproducing from a recording medium PCM data and sub-code data recorded thereon, said sub-code data having sub-data and sub-ID for adding auxiliary information to said PCM data, and a recording device for recording said PCM data and sub-code data transmitted from said reproducing device, in which said reproducing device includes data transmission means for producing a transmission signal having at least a preamble portion, an AUX-DATA portion and a PCM data portion relative to each PCM data of one word and in which said sub-code data and PCM data reproduced from said recording medium are arranged respectively into said AUX-DATA portion and PCM data portion on said sub-frame format, said AUX-DATA portion further having arranged therein a flag to show a state of correction of said sub-code data, and for subjecting said transmission signal to bi-phase modulation, and in which said recording device includes means for judging whether said sub-code data is correct and for selectively recording on a recording medium only sub-code data which has been judged to be correct, of those sub-code data transmitted from said reproducing device.

9. A PCM signal reproducing/recording apparatus according to claim 8, in which the arrangement of said sub-data and sub-ID into said AUX-DATA portion is performed for each frame.

10. A PCM signal reproducing/recording apparatus according to claim 9, in which said reproducing device has sub-ID including program NO and control ID and transmits said program NO and control ID once for every frame.

11. A PCM signal reproducing/recording apparatus according to claim 8, in which said recording device includes means for judging specific data showing whether said sub-code data is correct or not so that said recording device records only the sub-code data which has been proven to be correct as a result of judgement, onto the recording medium.

12. A PCM signal reproducing/recording apparatus according to claim 8, in which said recording device is arranged so that when the same sub-code data is to be recorded N-times in a predetermined region on the recording medium, sub-code data which has been proven to be incorrect is replaced by sub-code data which has been prove to be correct and the sub-code data which has been proven to be correct is recorded N-times repeatedly in said predetermined region on said recording medium.

* * * * *